UNITED STATES PATENT OFFICE.

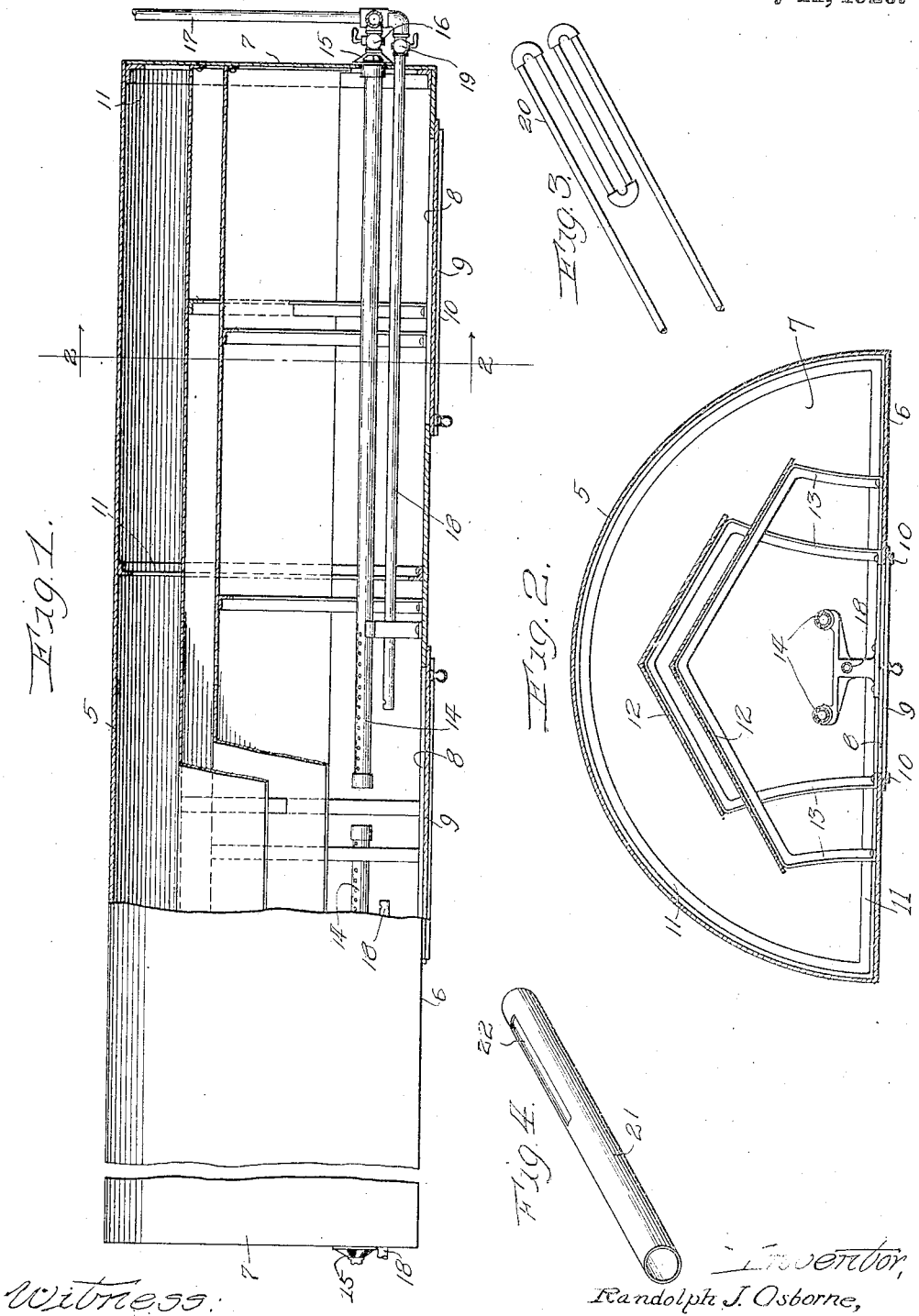

RANDOLPH J. OSBORNE, OF CHICAGO, ILLINOIS.

RUG-DRYING DEVICE.

1,339,784.                Specification of Letters Patent.       Patented May 11, 1920.

Application filed April 10, 1919. Serial No. 289,081.

*To all whom it may concern:*

Be it known that I, RANDOLPH J. OSBORNE, a citizen of the United States, residing at Chicago, in the county of Cook and State of Illinois, have invented certain new and useful Improvements in Rug-Drying Devices, of which the following is a specification.

My invention relates to drying devices, and has for its object the provision of a simple and efficient drying device suitable for drying rugs, carpets, fabrics, and the like.

Other objects will appear hereinafter.

An embodiment of my invention is shown in the accompanying drawing, forming a part of this specification, and in which—

Figure 1 is a side view with parts broken away to show the internal construction of a device embodying my invention;

Fig. 2 is a section taken on line 2—2 of Fig. 1;

Figs. 3 and 4 are isometric views of different forms of heaters adaptable for use in the device.

Referring more particularly to the drawing I have indicated a housing having its upper wall 5 substantially semi-cylindrical with its longitudinal edges attached to the longitudinal edges of a substantially plane bottom wall 6. The end walls 7 are attached to the ends of the upper and bottom walls. This arrangement of the walls provides a very convenient and efficient housing, but I do not wish to be limited to the exact shapes shown, as it will be found that other shapes will give very good results. The housing is preferably closed, except in one of the walls. I have shown openings 8 in the bottom wall for gaining access to the interior of the housing, and also for admitting air to the heating element when a gas burner, or the like, is used for heating purposes. The openings 8 are preferably closed by doors 9, which may be mounted in any convenient manner, such as in the slideways 10 indicated in Fig. 2. The interior of the housing is preferably strengthened by angle bar frames 11, or any other suitable or convenient means.

Disposed in the housing are one or more deflectors 12. These deflectors may have any desirable cross-section. I have indicated them as being angular or A-shaped in cross-section with the apex of each deflector higher than the longitudinal edges thereof. Any other desirable cross-section may be utilized when so desired. It will be found that one deflector 12 may be used with very good results. When more than one is used, these deflectors are spaced apart, substantially as indicated in Fig. 2, so that heat coming up from the burner will engage the central portion of the lowermost deflector and pass down around the longitudinal edges thereof, and upwardly against the top wall 5. A considerable amount of the heat will pass directly through the lower deflector and engage the upper deflector which will be partly radiated through this upper deflector and partly around the longitudinal edges thereof, and then toward the wall 5. The lower deflector is preferably formed considerably wider than the upper deflector, but the relative widths may be varied when so desired. I have indicated the deflectors 12 as being mounted on angle bar frames 13, and it will be understood that these deflectors may be mounted in any desirable manner in the housing.

The housing is preferably formed in a considerable length, and may be formed in any length to meet particular requirements. When formed of long lengths, I preferably provide two heating elements so that both may be used together, or each independently, as desired. This gives a great variation in the heating of the device. In Figs. 1 and 2 I have indicated gas burners for providing a heater for the device. In this form are elongated burner members 14 which extend from the end wall 7 substantially to the center of the housing. Each burner member 14 has an air mixer 15 outside a wall 7 and is connected through a valve 16 with a gas pipe 17 so that gas may be admitted from a pipe 17 through the valve 16 into the mixer 15 where it will be mixed with air and passed into the burner member 14. The openings in the burners 14 are preferably provided only near the central portions of the housing, although the number of openings in the burner members may be varied as required. I preferably provide a pilot burner 18 which is connected through a valve 19 with the pipe 17 so that the pilot burner 18 may be continuously lighted, and when it is desired to turn on one or more of the burner members 14 their proper valve 16 may be manipulated to light such burner members.

I have shown the heating member as being gas burners in Figs. 1 and 2, but it will be found that many other forms of heating elements may be employed. A heating element of steam or hot water pipes, such as indicated at 20 in Fig. 3, may be mounted in the housing in the position of the burner members 14 when so desired. Also, it will be found that a heater pipe 21 of an air-heating furnace or other heating apparatus may be introduced in the housing 5 to take the place of the burner members 14 when so desired. The air tube 21 is indicated as having an opening 22 in its upper side for discharging hot air into the housing, but any other form of opening may be provided in the tube 21 when so desired. Also, the length of the opening 22 may be varied when so desired. Furthermore, any other desirable form of heating members may be utilized.

In use a rug, carpet, or other article to be dried is placed over the curved wall 5 and the heat from the heating element radiated through said wall to effect drying of the article. The device may be mounted in any desirable manner, but preferably up so that access can be had to the openings 8.

I claim:—

1. A drying device comprising a wall curved upwardly in cross-section throughout its length, a heating element under the central portion of the wall, and a deflector disposed between the wall and heating element, the deflector having its central portion higher than its longitudinal edge portions.

2. A drying device comprising a wall curved upwardly in cross-section throughout its length, a heating element under the central portion of the wall, and a plurality of deflectors spaced apart and disposed between the wall and heating element, said deflectors each having its central portion higher than its longitudinal edge portions.

3. A drying device comprising a housing having walls inclosing a chamber with the upper wall curved upwardly, a heater in the chamber, and a deflector in the housing angular in cross-section with the apex thereof adjacent the upper wall of the housing.

4. A drying device comprising a housing having its upper wall curved, its bottom flat and attached to the lateral edges of the curved wall and end walls attached to the ends of the curved wall and bottom, there being an opening in one of said walls and the other of said walls being solid, a heater in the housing, and a plurality of deflectors A-shaped in cross-section in the housing with the bottom deflector wider than the deflector above it.

5. A drying device comprising a semi-cylindrical housing with an opening in its bottom wall, a door fitted in and adapted to close said opening, a heater in the housing, and a deflector between the heater and upper portion of the housing.

6. A drying device comprising a substantially tight housing of sheet metal having its upper wall substantially semi-cylindrical and its bottom and end walls flat, there being an opening in the bottom wall for gaining access to the interior of the housing; a door in and closing said opening; a plurality of spaced deflectors in the housing with each deflector having its central portion higher than its edge portions; and a heating element under said deflectors.

In testimony whereof I have signed my name to this specification on this 5th day of April, A. D. 1919.

RANDOLPH J. OSBORNE.